US008654738B2

(12) United States Patent
Trung et al.

(10) Patent No.: US 8,654,738 B2
(45) Date of Patent: Feb. 18, 2014

(54) METHOD FOR SUPPORTING FLOW MOBILITY

(75) Inventors: Tran Minh Trung, Daejeon (KR); Jung Soo Park, Daejeon (KR); Hyoung Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 31 days.

(21) Appl. No.: 13/181,056

(22) Filed: Jul. 12, 2011

(65) Prior Publication Data

US 2012/0147849 A1 Jun. 14, 2012

(30) Foreign Application Priority Data

Dec. 14, 2010 (KR) ........................ 10-2010-0127373

(51) Int. Cl.
*H04J 1/16* (2006.01)
*H04W 74/00* (2009.01)
*H04W 36/00* (2009.01)

(52) U.S. Cl.
CPC ........ *H04W 36/0022* (2013.01); *H04W 36/005* (2013.01)
USPC .......................................... 370/331; 455/436

(58) Field of Classification Search
CPC . H04W 80/04; H04W 36/18; H04W 36/0011; H04W 36/14; H04W 36/08; H04W 36/005; H04W 36/0022
USPC ......... 370/235, 254, 321, 328–333, 338, 352, 370/401, 445; 713/310, 320, 322; 455/436, 455/439, 442
See application file for complete search history.

(56) References Cited

U.S. PATENT DOCUMENTS

| | | | | |
|---|---|---|---|---|
| 2010/0091653 | A1* | 4/2010 | Koodli et al. | 370/235 |
| 2010/0202374 | A1* | 8/2010 | Aramoto | 370/329 |
| 2010/0272062 | A1* | 10/2010 | Velev et al. | 370/331 |
| 2011/0134869 | A1* | 6/2011 | Hirano et al. | 370/329 |
| 2011/0164599 | A1* | 7/2011 | Sarikaya et al. | 370/338 |

OTHER PUBLICATIONS

Koodli, Rajeev., et al., “Flow Handover for Proxy Mobile IPv6, draft-koodli-netext-flow-handover-01 (work in progress)”, Oct. 14, 2009.
Xia, F., “Flow Binding in Proxy Mobile IPv6, draft-xia-netext-flow-binding-02 (work in progress)”, Jun. 25, 2010.
Bernardos, CJ., et al., “Proxy Mobile IPv6 Extensions to Support Flow Mobility, draft-bernardos-netext-pmipv6-flowmob-00”, Jul. 5, 2010.
Bernardos, CJ., et al., “Proxy Mobile IPv6 Extensions to Support Flow Mobility , draft-bernardos-netext-pmipv6-flowmob-03”, Mar. 14, 2011.
Tran Mihn Trung, et al., Flow Tracking Procedure for PMIPv6 Draft-Trung-Netext-Flow-Tracking-01, Jul. 12, 2010.
T. Tran, et al., “Flow Tracking Procedure for PMIPv6 Draft-Trung-Netext-Tracking-01”, IETF Trust, Jul. 12, 2010, pp. 1-16.

* cited by examiner

*Primary Examiner* — Awet Haile
(74) *Attorney, Agent, or Firm* — H.C. Park & Associates, PLC

(57) ABSTRACT

A method of supporting flow mobility of an MN is provided in an LMA. The LMA updates a BCE when a flow of the MN moves from a first MAG to a second MAG. The LMA sends a message for requesting binding registration of the flow to the second MAG, and sends a message for requesting binding de-registration of the flow to the first MAG.

15 Claims, 8 Drawing Sheets

10
LMA
MAG
21
MAG
22
MN
30

FIG. 7

| | | | | | | | | | SEQUENCE # |
|---|---|---|---|---|---|---|---|---|---|
| A | H | L | K | M | R | P | N | RESERVED | LIFETIME |
| MOBILITY OPTIONS | | | | | | | | | |

FIG. 8

| | STATUS | K | R | P | S | F | |
|---|---|---|---|---|---|---|---|
| SEQUENCE # | LIFETIME | | | | | | |
| MOBILITY OPTIONS | | | | | | | |

METHOD FOR SUPPORTING FLOW MOBILITY

CROSS-REFERENCE TO RELATED APPLICATION

This application claims priority to and the benefit of Korean Patent Application No. 10-2010-0127373 filed in the Korean Intellectual Property Office on Dec. 14, 2010, the entire contents of which are incorporated herein by reference.

BACKGROUND (a) Field

The present invention relates to a method for supporting flow mobility.

(b) Description of the Related Art

Recently, the NetExt (network-based mobility extensions) and MIF (multiple interfaces) working groups of the IETF (Internet Engineering Task Force) have been researching technologies for supporting mobility service over multiple interfaces. Particularly, technologies for providing mobility for each certain application flow are being examined.

Since the Proxy Mobile IPv6 (PMIPv6) can support multi-homing, a mobile node (MN) with multiple interfaces can simultaneously send packets to a PMIPv6 domain that supports multiple interfaces over the multiple interfaces.

When a flow moves from a current interface to a new interface, a home network prefix (HNP) used by the flow is assigned to the new interface. This action can discontinue the ongoing sessions on both interfaces since the HNP cannot be used in an old interface.

In the case that an HNP is shared by multiple flows, when only some of these flows are moved from the old interface to the new interface, the old interface and the new interface should be able to share the same HNP. This function is not supported by the current PMIPv6 standard.

Further, after moving flows to the new interface, if these flows share the same HNP, a mobile access gateway (MAG) and a local mobility anchor (LMA) should be able to forward flows based not only on the HNP but also on flow identification. That routing capability is not supported by the current PMIPv6 standard.

SUMMARY

Embodiments of the present invention provide a method for supporting flow mobility in a mobility condition.

According to an embodiment of the present invention, a method of supporting flow mobility of a mobile node is provided in an LMA. The method includes updating a binding cache entry (BCE) when a flow of the mobile node moves from a first MAG to a second MAG, sending a first message for requesting binding registration of the flow to the second MAG, and sending a second message for requesting binding de-registration of the flow to the first MAG.

When updating the BCE, the flow may be bound to an address of the second MAG.

Each of the first message and the second message may be a proxy binding acknowledgement (PBA) message. The PBA message may include a first flag representing an update of flow mobility and a second flag representing the binding registration or de-registration of the flow.

The first flags of the first and second messages may have the same value, and the second flags of the first and second messages may have different values.

The PBA message may further include identification information for the flow.

The flow may move when the mobile node that has been attached to the first MAG via a first physical interface is attached to the second MAG via a second physical interface. The method may further include receiving a third message including handover indication information from the second MAG before updating the BCE. The third message may be a proxy binding update (PBU) message, and the PBU message may include identification information for the flow.

The flow may move when the mobile node determines to switch the flow from a first physical interface attached to the first MAG to a second physical interface attached to the second MAG. The method may further include receiving a third message from the second MAG before updating the BCE, the third message including information that the flow has been received as a new flow. The third message may be a PBU message, and the PBU message may further include a flag indicating the new flow and identification information for the flow.

The flow may move when a network policy is changed or a service profile of the mobile node is changed.

According to another embodiment of the present invention, a method of supporting flow mobility of a mobile node is provided in an LMA. The method includes sending a first message to an existing MAG for a flow of the mobile node, and sending a second message to a new MAG for the flow. Each of the first message and the second message may be a proxy binding acknowledgement (PBA) message including a first flag and a second flag. The first flags of the first and second messages may have the same value, and the second flags of the first and second messages may have different values.

The PBA message may further include identification information for the flow.

According to yet another embodiment of the present invention, a method of supporting flow mobility of a mobile node is provided in an MAG. The method includes receiving a message for requesting binding registration of a flow from an LMA, updating a binding update list entry (BULE) by adding the flow to the BULE, and setting routing for the flow.

The message may be a proxy binding acknowledgement (PBA) message, and the PBA message may include a first flag representing an update of flow mobility and a second flag representing the binding registration of the flow.

The PBA message may further include identification information for the flow.

The method may further include receiving a router solicitation message from the mobile node when the mobile node whose flow has been set via a first physical interface attached to the existing MAG is attached to a second physical interface, and sending a message having handover indication information to the LMA.

The method may further include receiving a packet from the mobile node when the mobile node determines to switch the flow from the first physical interface to the second physical interface, detecting the flow in a header of the packet, and sending a message indicating a new flow to the LMA when the same flow as the flow does not exist in the BULE.

When receiving the message, the message may be received from the LMA when a network policy is changed or a service profile of the mobile node is changed.

BRIEF DESCRIPTION OF THE DRAWINGS

FIG. 7 is a drawing showing a PBU message according to an embodiment of the present invention.

FIG. 8 is a drawing showing a PBA message according to an embodiment of the present invention.

DETAILED DESCRIPTION OF THE EMBODIMENTS

Figure 1:
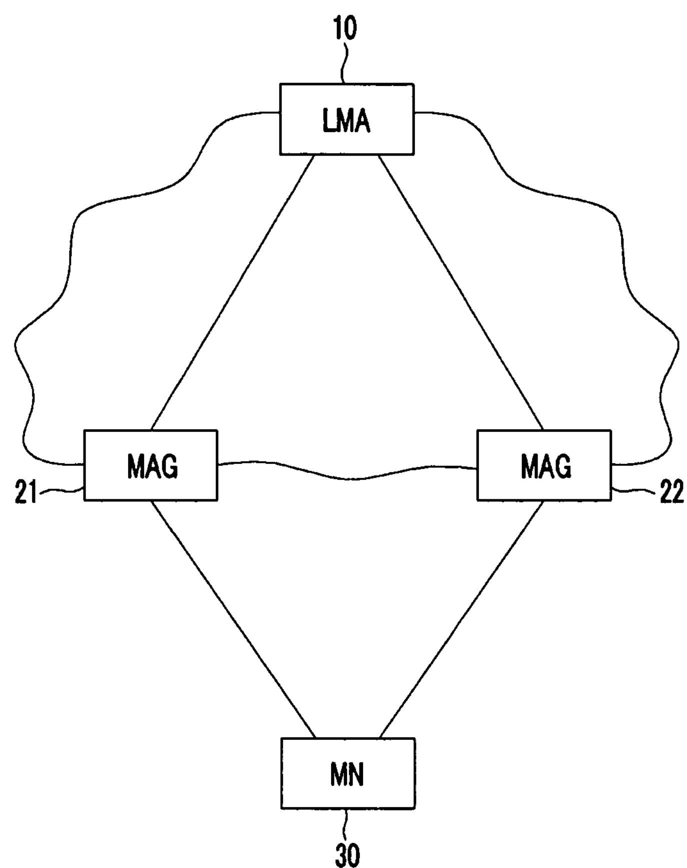
FIG. 1 is a schematic drawing of a mobility support system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic drawing of a mobility support system according to an embodiment of the present invention.

Referring to FIG. 1, the mobility support system includes an LMA 10, a plurality of MAGs 21 and 22, and an MN 30.

The LMA 10 is connected to the internet, and manages a mobility procedure that is performed in a network, for example a PMIP domain.

The MAGs 21 and 22 sense movement of the MN 30, and perform the mobility procedure with the LMA 10.

The MN 30 is a user terminal having mobility, and has a plurality of physical interfaces. The MN 30 uses link layer implementation to support flow mobility. The MN 30 can hide the physical interfaces from an IP stack by the link layer implementation. A logical interface is provided to the IP layer such that packets can be transmitted and received over various physical interfaces. The logical interface of the MN 30 may have the following functions to support the flow mobility.

1. The logical interface may simultaneously or sequentially attach to multiple MAGs.

2. The logical interface may have a single or multiple HNPs.

3. The logical interface may accept all the packets that have a valid HNP and are received from any physical interface that is abstracted by the logical interface.

4. The logical interface sends and receives a flow via the same interface.

5. The logical interface may dynamically map a flow to a physical interface. This mapping is determined based on the network connection, and may be performed by a connection manager.

Further, triggers that activate the flow mobility procedure in the mobility support system are listed as follows.

1. Trigger 1: The MN 30 performs an attachment over a new interface.

The MAG 21 or 22 is aware of the event and sends a proxy binding update (PBU) message with handover indication information to the LMA 10. The LMA 10 updates information about a current position of the MN 30.

2. Trigger 2: The MN 30 recognizes a change of network conditions and decides to move a flow from one physical interface to another.

Since the MN 30 uses the logical interface, the movement of a flow between physical interfaces is transparent to the IP layer. The MAG 21/22 can be aware of this event by analyzing the packets received from the MN 10. The MAG 21/22 uses indication information within the PBU message to inform that the MAG 21/22 receives a new flow from the MN 10.

3. Trigger 3: The LMA 10 determines the flow mobility due to some reasons.

For example, the LMA 10 can recognize a change of policy profile which includes the mapping of a flow to each access network technology. Alternatively, the LMA 10 can recognize a change of network conditions for wired links as well as wireless links.

According to each kind of trigger, the MAG 21/22 and the LMA 10 perform a specific flow mobility procedure. This procedure can be performed by signaling between the MAG 21/22 and the LMA 10.

Next, a flow mobility support method according to an embodiment of the present invention will be described with reference to FIG. 2 to FIG. 4.

For convenience of description, it is assumed that the MN 30 has two physical interfaces PI1 and PI2 and the two physical interfaces PI1 and PI2 can attach to the LMA 10, i.e., the network over the MAGs 21 and 22, respectively.

Figure 2:
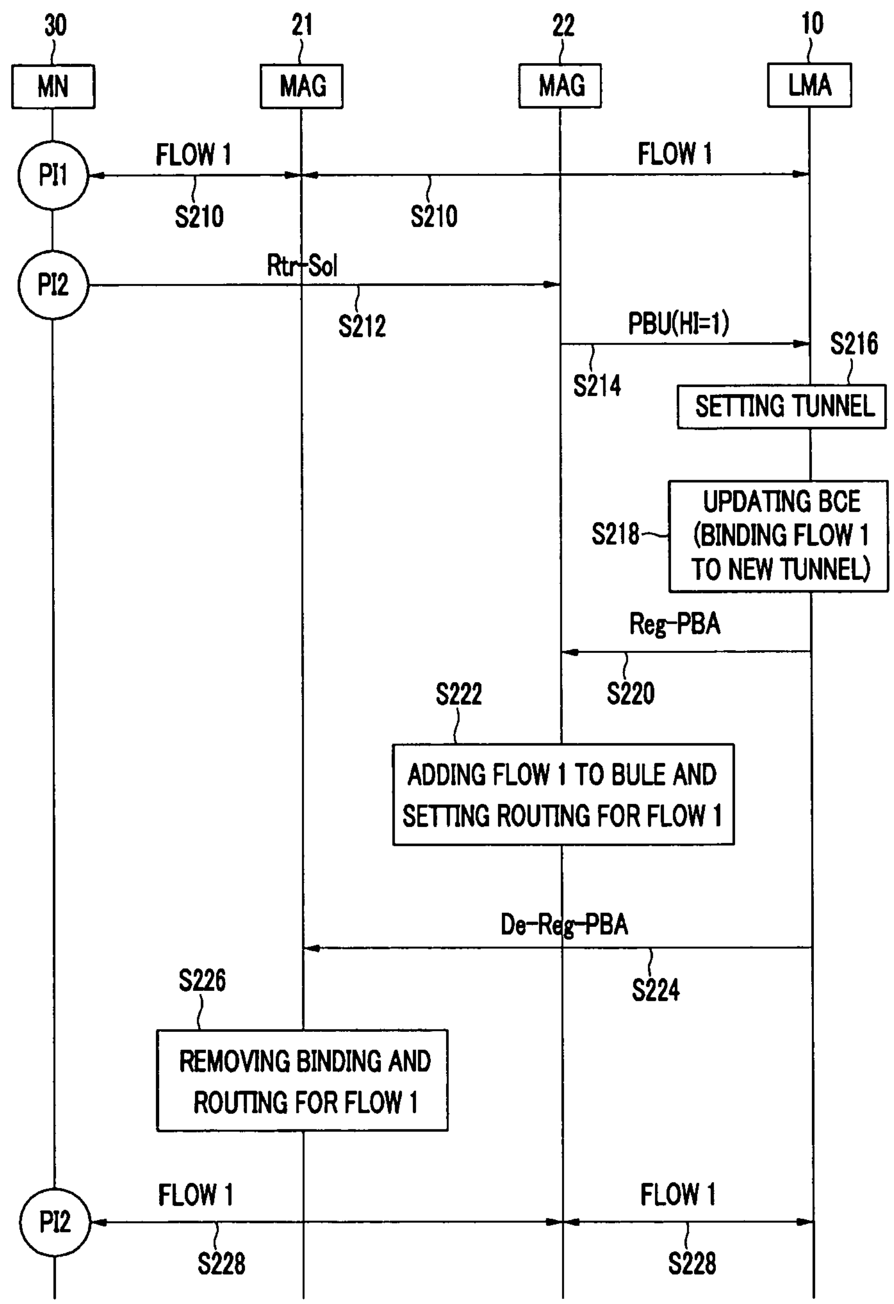
FIG. 2, FIG. 3, and FIG. 4 are schematic flowcharts of a flow mobility support method according to an embodiment of the present invention.

FIG. 2 is a schematic flowchart of a flow mobility support method according to an embodiment of the present invention, and shows flow mobility between an existing attachment and a new attachment. The flow mobility of FIG. 2 may occur when the trigger 1 is activated.

Referring to FIG. 2, the MN 30 is attached to the MAG 21 over the physical interface PI1, and flow 1 is established by the physical interface PI1 attached to the MAG 21 (S210).

Next, the MN 30 attaches to the MAG 22 over the physical interface PI2 (S212). The MAG 22 can recognize the attachment from the MN 30 over the physical interface PI2 by a router solicitation message (Rtr-Sol) that the MN 30 sends. Then, the MAG 22 sends a PBU message with handover indication information to the LMA 10 (S214). A handover indicator (HI) field of the PBU message may be set to "1".

The LMA 10, on receiving the PBU message, sets a new tunnel and looks up all of the flows that are served by the MN 30 (S216). For each of the flows, the LMA 10 checks the profile of the MN 30 and operator policy, and searches the flows that need to be moved to the new attachment. The LMA 10 determines to move the flow 1 from the physical interface PI1 to the physical interface of PI2. Then, the LMA 10 updates a binding cache entry (BCE) (S218). Accordingly, the flow 1 is bound to an address of the MAG 22, for example a proxy care of address (proxy-CoA). Then, the LMA 10 sends a proxy binding acknowledgement (PBA) message (Reg-PBA) (S220). The PBA message (Reg-PBA) has information for requesting flow binding registration. When receiving the PBA message (Reg-PBA), the MAG 22 adds the flow 1 to a binding update list entry (BULE) to update the BULE, and sets routing for the flow 1 (S222). Further, the LMA 10 sends a PBA message (De-Reg-PBA) to the MAG 21 (S224). The PBA message (De-Reg-PBA) has information for requesting flow binding de-registration. The MAG 21, on receiving the PBA message (De-Reg-PBA), removes information on the flow 1 from the BULE and a routing table (S226). That is, the MAG 21 removes the binding and routing for the flow 1. After completing these processes, the flow 1 is exchanged between the MAG 22 and the LMA 10 via the attachment of the physical interface PI2 (S228).

Figure 3:
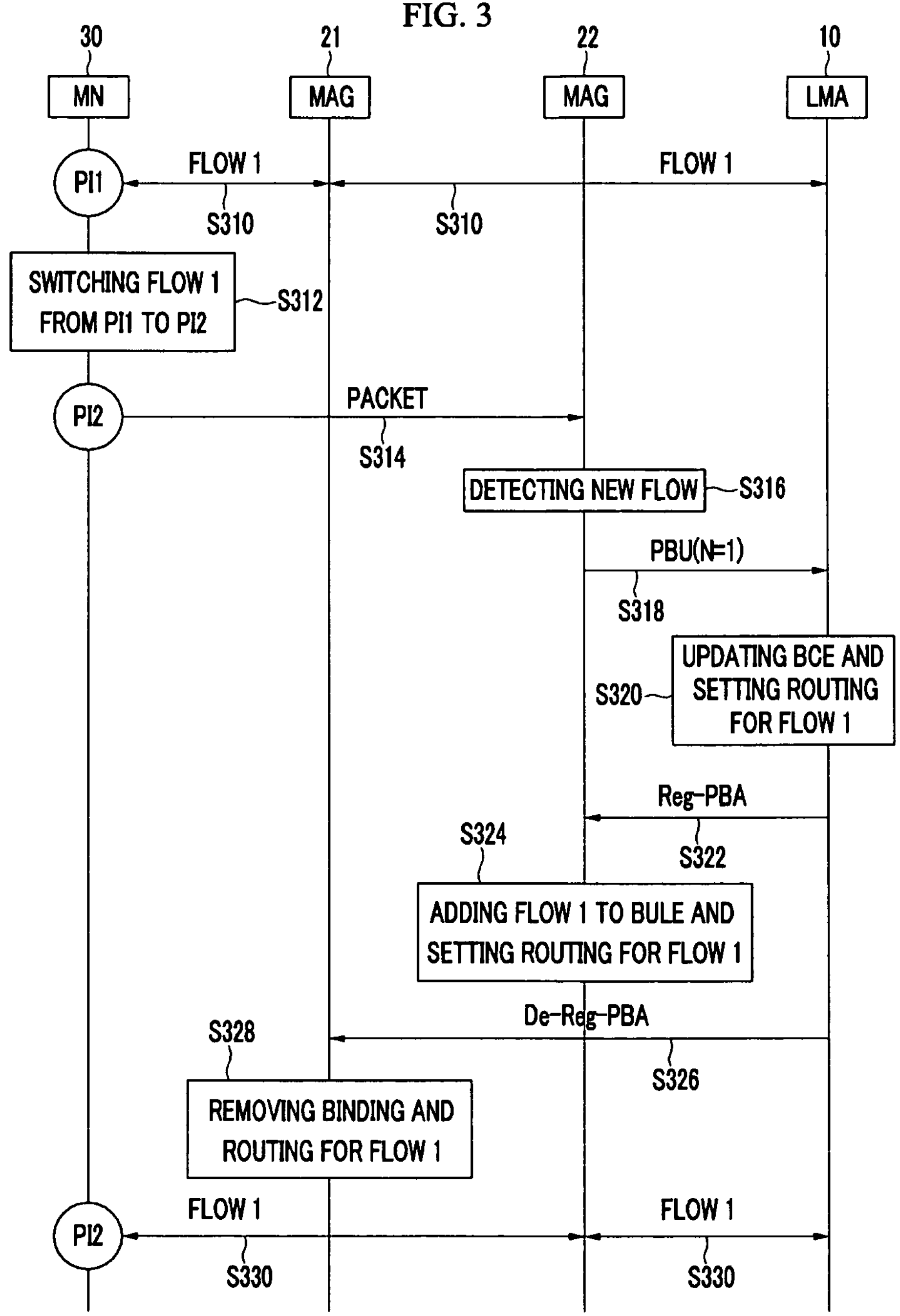

FIG. 3 is a schematic flowchart of a flow mobility support method according to another embodiment of the present invention, and shows flow mobility between existing attachments. The flow mobility of FIG. 3 may occur when the trigger 2 is activated.

Referring to FIG. 2, the MN 30 is attached to the MAG 21 over the physical interface PI1 (S210). The flow 1 is served by the physical interface PI1.

Next, when the MN 30 detects that the condition of the attachment via the physical interface PI2 is better for serving the flow 1, the logical interface of the MN 30 determines to switch the flow 1 from the physical interface PI1 to the physical interface PI2 (S312). If the MN 30 uses the logical interface, a switching process of the flow is performed at a link layer and is transparent to an IP layer. When the MAG 22 receives the first packet from the flow 1 (S314), it analyzes flow information from packet header to detect a new flow, and checks whether the same flow as the new flow exists in the BULE (S316). If the MAG 22 cannot find the same flow in the BULE, it sends a PBU message to the LMA 10 (S318). The PBU message has information that the MN 30 has received the new flow. When receiving the PBU message, the LMA 10 looks for the same flow in the BCE to check whether the flow 1 is a flow that has moved from an existing attachment. If the flow 1 is a flow that has moved from the existing attachment, the LMA 10 updates the BCE to bind the flow 1 to the Proxy-CoA of the MAG 22 and sets routing for the flow 1 (S320). Subsequently, the LMA 10 sends a PBA message (Reg-PBA) for requesting flow binding registration to the MAG 22 (S320). The MAG 22, on receiving the PBA message (Reg-PBA), adds the flow 1 to the BULE to update the BULE, and sets the routing for the flow 1 (S324). Subsequently, the LMA 10 sends a PBA message (De-Reg-PBA) for requesting flow binding de-registration to the MAG 21 (S326). When receiving the PBA message (De-Reg-PBA), the MAG 21 removes information on the flow 1 from the BULE and the routing table (S328). After completing these processes, the flow 1 is exchanged between the MAG 22 and the LMA 10 via the attachment of the physical interlace PI2 (S330).

Figure 4:
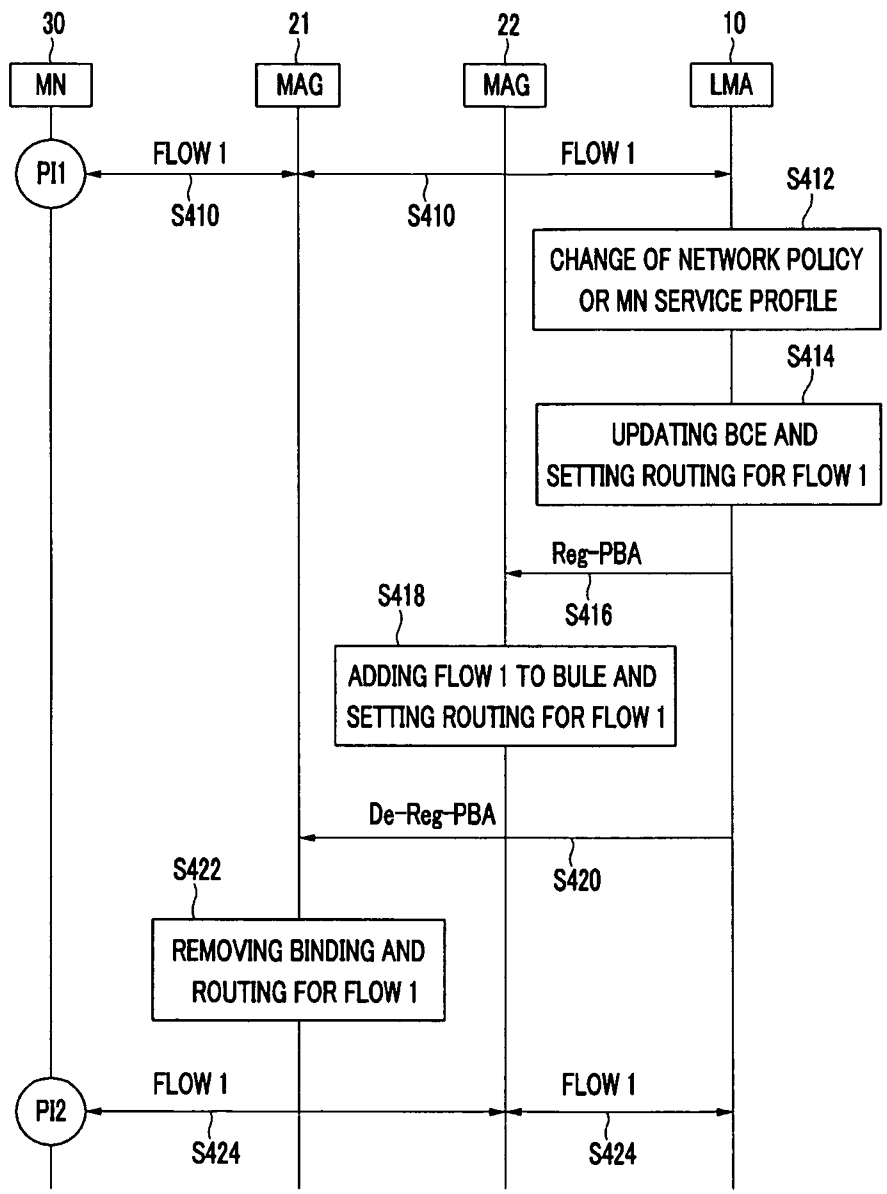

FIG. 4 is a schematic flowchart of a flow mobility support method according to yet another embodiment of the present invention, and shows the case that the LMA 10 moves a flow. The flow mobility of FIG. 4 may occur when the trigger 3 is activated.

Referring to FIG. 4, the MN 30 is attached to the MAG 21 over the physical interface PI1, and the flow 1 is served by the physical interface PI1 attached to the MAG 21 (S410).

The LMA 10 determines to move some flows from an existing attachment to another when a network policy of an operator is changed or a service profile of the MN 30 is changed (S412), When determining to move flow 1, the LMA 10 updates the BCE to bind the flow 1 to the proxy-CoA of the MAG 22 and sets routing for the flow 1 (S414). Next, the flow 1 is exchanged between the MAG 22 and the LMA 10 via the attachment of the physical interface PI2 (S416, S418, S420, S422, and S424), in the same manner as the steps (S220, S222, S224, S226, and S228) described with reference to FIG. 3.

Hereinafter, an LMA according to an embodiment of the present invention will be described with reference to FIG. 5 and FIG. 6

Figure 5:
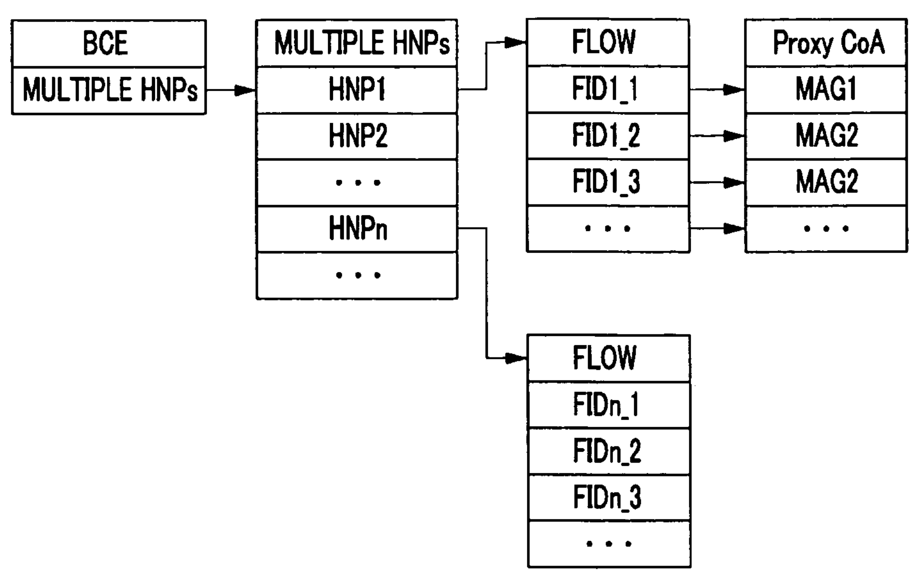
FIG. 5 is a drawing showing extension of a BCE according to an embodiment of the present invention.
Figure 6:
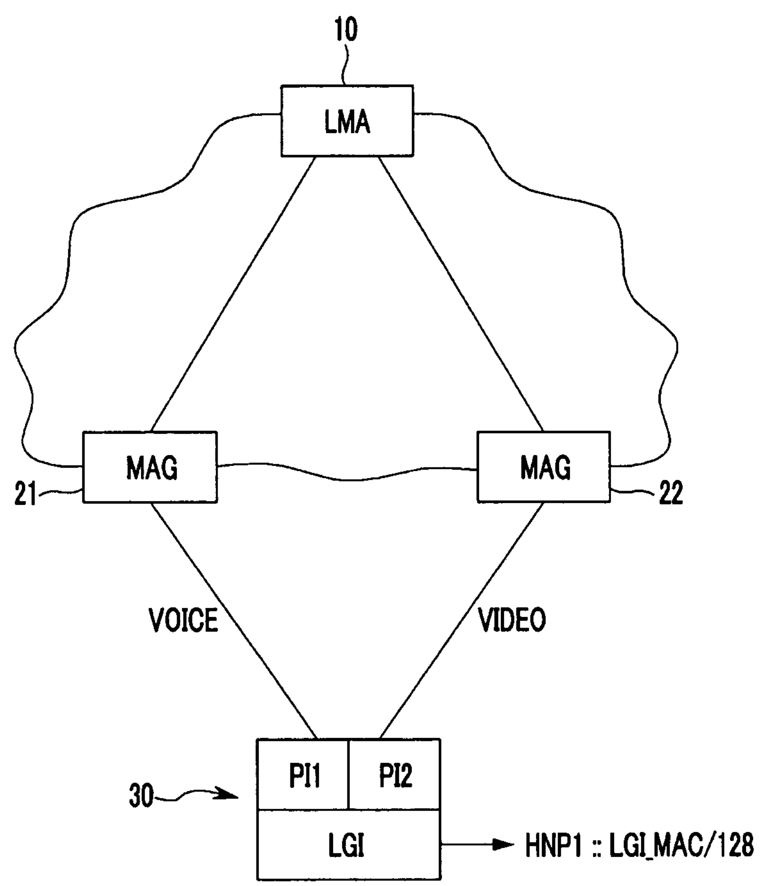
FIG. 6 is a drawing showing an example of an address configuration method in a mobility support system according to an embodiment of the present invention.

FIG. 5 is a drawing showing extension of a BCE according to an embodiment of the present invention, and FIG. 6 is a drawing showing an example of an address configuration method in a mobility support system according to an embodiment of the present invention.

An LMA is extended to manage flow information. A flow is represented by description information. The flow description information includes a source address, a destination address, a source port, a destination port, and a protocol type. The flow description information may further include a flow label and a traffic class. The LMA generates a unique identifier (ID) for each flow, and uses the flow ID as an extension field of the BCE to identify the flow. The LMA manages a table for maintaining mapping between the flow ID and the flow description information, i.e., a flow ID management table. After a specific time, if the LMA does not receive any packet that has header information associated with any of the flow description information in this table, the LMA removes a corresponding record in the table.

Table 1 shows an example of the flow ID management table.

TABLE 1

| Flow ID | Flow description information |
|---|---|
| 41266 | Source address: ex) 2001:252:0:1::2008:8<br>Destination address: ex) 2001:252:0:1::2008:6<br>Sour port: ex) 25<br>Destination port: ex) 110<br>Protocol type: ex) TCP |
| 65782 | Source address: ex) 2001:252:0:1::2008:3<br>Destination address: ex) 2001:252:0:1::2008:2<br>Source port: ex) 21<br>Destination port: ex) 21<br>Protocol type: ex) TCP |
| . . . | . . . |

To support the flow mobility, the LMA manages the BCE to contain the flow information. Each BCE includes information of all flows generated from an MN.

Since multiple flows use the same HNP and different flows are bound to different proxy-CoAs, the BCE can be extended as showed in FIG. 5. Referring to FIG. 5, each BCE includes multiple HNPs (HNP1, NHP2, . . . , HNPn), each HNP includes multiple flows (FID1_1, FID1_2, FID1_3, . . . , FIDn_1, FIDn_2, FIDn_3, . . . ), and each flow is bound to a specific Proxy-CoA (MAG1, MAG2, . . . ). With this extension, the flow can be moved from one path to another path by simply changing a value of the proxy-CoA. A BCE manager 12 looks up the BCE based on not only the HNP but also the flow ID.

Since a logical interface hides multiple physical interfaces from an IP stack, the HNPs are assigned to the logical interface only. This means that the LMA sends/receives packets with an HNP address to/from the MN 30 via only the physical interfaces that are abstracted by the logical interface.

Referring to FIG. 6, an MN 30 attaches to the different networks via two physical interfaces. For example, the MN 30 attaches to an MAG 21 of the 3GPP network via the physical interface PI1, and attaches to an MAG 22 of the WiMAX network via the physical interface PI2. The physical interfaces PI1 and PI2 are abstracted by a logical interface LGI. An HNP is assigned to the logical interface LGI, and the logical interface has a global address, for example HNP1::LGI_MAC/128, where LGI_MAC is a link-layer address of the logical interface LGI. The MN 30 can send voice traffic via the physical interface PI1 and video traffic via the physical interface PI2. A flow for the voice traffic and a flow for the video traffic use the same HNP.

Next, an MAG according to an embodiment of the present invention will be described.

The MAG is extended to manage flow information. A flow is represented by flow description information including a source address and a destination address. The MAG generates a unique ID for each flow using the same algorithm as the LMA uses. The flow ID is included in a BULE to represent the flow. Further, the MAG manages a table for maintaining mapping between the flow ID and the flow description information. After a specific time, if the MAG does not receive any packet that has the same header information as any of the flow description information in this table, the MAG removes a corresponding record in the table.

Similar to the BCE, the BULE is extended to include the flow information. A BULE includes multiple HNPs, each of which is mapped to multiple flows. Each flow is bound to a specific tunnel interface, i.e., a tunnel interface ID (tunnel-if-id).

When the MAG processes a PBA message, it checks a value of a flow mobility indicator within the PBA message to determine flow binding registration or de-registration.

If the flow mobility indicator has a value (e.g., "1") representing the flow binding registration, the MAG adds the associated information to the BULE and binds the BULE to the tunnel-if-id. The tunnel-if-id has a function of an end point, similar to an address of the LMA that is used to send the PBA message, and also creates routing state information for tunneling a specific flow.

If the flow mobility indicator has a value (e.g., "0") representing the flow binding de-registration, the MAG removes the flow information from the BULE. Further, the MAG removes the routing state information for tunneling the flow.

Next, a PBU message and a PBA message according to an embodiment of the present invention will be described with reference to FIG. 7 and FIG. 8.

Figure 7:
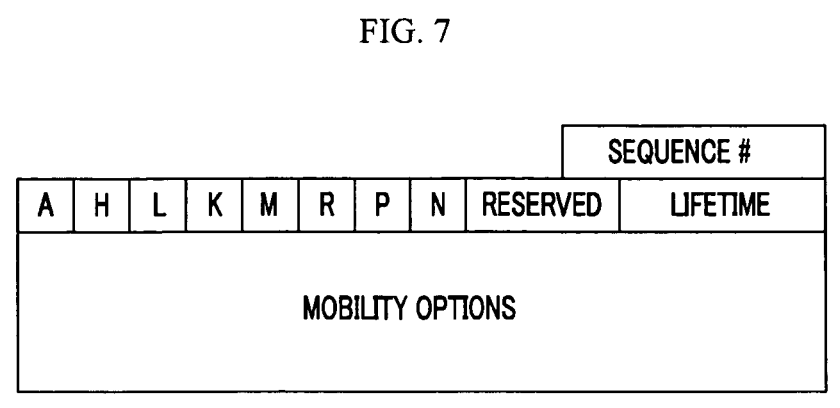
Figure 8:
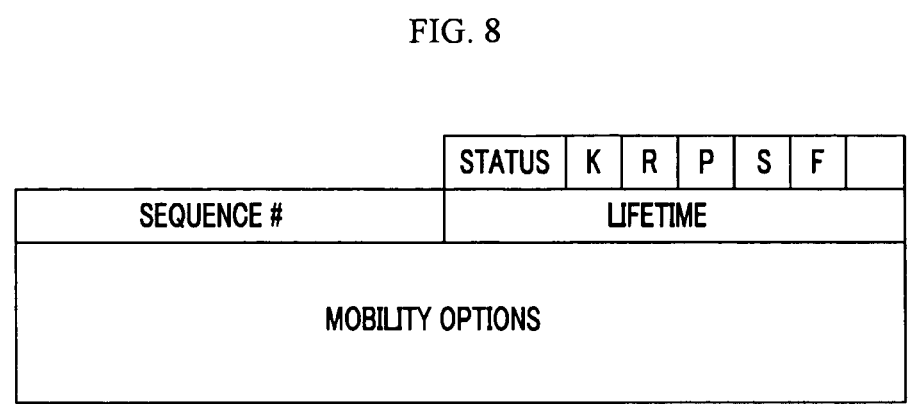

FIG. 7 is a drawing showing a PBU message according to an embodiment of the present invention, and FIG. 8 is a drawing showing a PBA message according to an embodiment of the present invention.

Referring to FIG. 7, the PBU message includes a plurality of flags A, H, L, K, M, R, P, and N containing a flow mobility flag N. The flow mobility flag N may be set to "1" when indicating that an MN has generated a new flow.

The PBU message further includes mobility options. The mobility options include flow identification information for identifying the new flow, and may further include handover indication information, MN identification information, and HNP identification information.

The PBU message may further include a sequence number (sequence #) and a lifetime of the message.

Referring to FIG. 8, the PBA message includes a plurality of flags K, R, P, S, and F containing flags S and F. The flag S is used to indicate that an LMA has processed a flow mobility update procedure, and may have a value of "1" in this case. Referring to examples of FIG. 2 to FIG. 4, the flag S having the value of "1" means that the LMA has moved management of the flow from the MAG 21 to the MAG 22.

The flag F is considered only when the flag S is set to "1". When the flag F is set to a predetermined value (e.g., "0"), the MAG having received the PBA message de-registers the flow. When the flag F is set to the other value (e.g., "1"), the MAG having received the PBA message registers the flow to manage the flow.

The PBA message includes mobility options. The mobility options include flow identification information, and may further include MN identification information and HNP identification information.

The PBA message may further include a sequence number (sequence #), and a lifetime and status of the message.

As described above, according to an embodiment of the present invention, when a flow should be moved by a determination of a terminal or a network, flow mobility can be supported. Accordingly, a user can continuously receive a service in a mobility condition.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of supporting flow mobility of a mobile node in a local mobility anchor (LMA), the method comprising:

generating a unique flow identifier (ID) for a flow of the mobile node, and using the flow ID as an extension field of a binding cache entry (BCE) to identify the flow;

updating the binding cache entry (BCE) using the flow identifier when the flow of the mobile node moves from a first mobile access gateway (MAG) to a second MAG;

sending a first message for requesting binding registration of the flow to the second MAG; and sending a second message for requesting binding de-registration of the flow to the first MAG;

wherein each of the first message and the second message is a proxy binding acknowledgement (PBA) message including the flow ID, home network prefix (HNP) identification information, a first flag and a second flag, and wherein the first flags of the first and second messages have the same value, and the second flags of the first and second messages have different values.

2. The method of claim 1, wherein said updating the BCE includes binding the flow to an address of the second MAG.

3. The method of claim 1, wherein said PBA message includes said first flag representing an update of flow mobility and said second flag representing the binding registration or de-registration of the flow.

4. The method of claim 1, wherein the flow moves when the mobile node that has been attached to the first MAG via a first physical interface is attached to the second MAG via a second physical interface.

5. The method of claim 4, further comprising receiving a third message including handover indication information from the second MAG before updating the BCE.

6. The method of claim 5, wherein the third message is a proxy binding update (PBU) message, and the PBU message includes identification information for the flow.

7. The method of claim 1, wherein the flow moves when the mobile node determines to switch the flow from a first physical interface attached to the first MAG to a second physical interface attached to the second MAG.

8. The method of claim 7, further comprising receiving a third message from the second MAG before updating the BCE, the third message including information that the flow has been received as a new flow.

9. The method of claim 8, wherein the third message is a proxy binding update (PBU) message, and the PBU message further includes a flag indicating the new flow and identification information for the flow.

10. The method of claim 1, wherein the flow moves when a network policy is changed or a service profile of the mobile node is changed.

11. A method of supporting flow mobility of a mobile node in a local mobility anchor (LMA), the method comprising:

generating a unique flow identifier (ID) for a flow of the mobile node, and using the flow ID as an extension field of a binding cache entry (BCE) to identify the flow;

updating the binding cache entry (BCE) using the flow ID;

sending a first message to an existing mobile access gateway (MAG) for the flow of the mobile node; and sending a second message to a new MAG for the flow, wherein each of the first message and the second message is a proxy binding acknowledgement (PBA) message including the flow ID, home network prefix (HNP) identification information, a first flag and a second flag, and wherein the first flags of the first and second messages have the same value, and the second flags of the first and second messages have different values.

12. A method of supporting flow mobility of a mobile node in a mobile access gateway (MAG), the method comprising:

receiving a message for requesting binding registration of a flow from a local mobility anchor (LMA);

updating a binding update list entry (BULE) having a flow identifier (ID) representing the flow by adding the flow to the BULE; and setting routing for the flow;

wherein the message is a proxy binding acknowledgement (PBA) message, and the PBA message includes, the flow ID, home network prefix (HNP) identification information, a first flag representing an update of flow mobility and a second flag representing the binding registration of the flow;

wherein the flow ID is unique flow identifier (ID) for the flow of the mobile node, and the MAG using the flow ID as an extension field of the BULE to identify the flow.

13. The method of claim 12, further comprising: receiving a router solicitation message from the mobile node when the mobile node whose flow has been set via a first physical interface attached to the existing MAG is attached to a second physical interface; and sending a message having handover indication information to the LMA.

14. The method of claim 12, further comprising:

receiving a packet from the mobile node when the mobile node determines to switch the flow from a first physical interface to a second physical interface; detecting the flow in a header of the packet; and sending a message indicating a new flow to the LMA when the same flow as the flow does not exist in the BULE.

15. The method of claim 12, wherein receiving the message includes receiving the message from the LMA when a network policy is changed or a service profile of the mobile node is changed.

* * * * *